United States Patent
Zhou et al.

(10) Patent No.: US 8,186,708 B2
(45) Date of Patent: May 29, 2012

(54) ASYMMETRIC SIDE AIRBAG FOR IMPROVED HEAD AND NECK PROTECTION

(75) Inventors: Rongrong Zhou, Canton, MI (US); Weigang Chen, Canton, MI (US); Krishnakanth E. Aekbote, Farmington Hills, MI (US); Bakhtyar Safder Baig, Canton, MI (US); Marwan Ahmad Elbkaily, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 278 days.

(21) Appl. No.: 12/719,362

(22) Filed: Mar. 8, 2010

(65) Prior Publication Data

US 2011/0215557 A1     Sep. 8, 2011

(51) Int. Cl.
  *B60R 21/16*     (2006.01)
(52) U.S. Cl. ............. 280/730.2; 280/743.1; 280/743.2
(58) Field of Classification Search .......... 280/730.1, 280/730.2, 743.1, 743.2
See application file for complete search history.

(56) References Cited

U.S. PATENT DOCUMENTS

| | | | |
|---|---|---|---|
| 5,112,079 A | 5/1992 | Haland et al. | |
| 5,718,450 A | 2/1998 | Hurford et al. | |
| 5,791,685 A | 8/1998 | Lachat et al. | |
| 5,803,485 A | 9/1998 | Acker et al. | |
| 5,845,935 A | 12/1998 | Enders et al. | |
| 5,911,434 A | 6/1999 | Townsend | |
| 6,851,706 B2 | 2/2005 | Roberts et al. | |
| 7,594,678 B2 * | 9/2009 | Schedler | 280/743.2 |
| 7,611,164 B2 * | 11/2009 | Kai et al. | 280/729 |
| 7,731,227 B2 * | 6/2010 | Hotta et al. | 280/730.2 |
| 7,793,973 B2 * | 9/2010 | Sato et al. | 280/730.2 |
| 7,793,977 B2 * | 9/2010 | Sato et al. | 280/743.2 |
| 7,796,379 B2 * | 9/2010 | Tsai | 361/679.32 |
| 7,938,440 B2 * | 5/2011 | Kataoka et al. | 280/730.2 |
| 7,946,616 B2 * | 5/2011 | Ochiai et al. | 280/730.2 |
| 8,091,920 B2 * | 1/2012 | Loibl et al. | 280/730.2 |
| 2006/0131847 A1 * | 6/2006 | Sato et al. | 280/730.2 |
| 2006/0232054 A1 * | 10/2006 | Schlosser et al. | 280/743.2 |
| 2008/0054603 A1 | 3/2008 | Breed et al. | |
| 2008/0100045 A1 | 5/2008 | Fukawatase et al. | |

* cited by examiner

*Primary Examiner* — Toan To
(74) *Attorney, Agent, or Firm* — Frank A. MacKenzie; Brooks Kushman P.C.

(57) ABSTRACT

A side airbag for an automotive vehicle includes an outboard panel having a perimeter edge and a first vertical length, and an inboard panel having a perimeter edge and a second vertical length shorter than the first vertical length, the inboard and outboard panels joined to one another around their respective perimeter edges to form an enclosed volume such that when the airbag is inflated a mid-thickness line is concave toward the inboard panel. When the inflated airbag is positioned between an occupant seat and a side wall of the vehicle, the inboard-curved shape provides early engagement between an occupant of the seat and the airbag to offer improved protection for the head and neck.

16 Claims, 3 Drawing Sheets

ASYMMETRIC SIDE AIRBAG FOR IMPROVED HEAD AND NECK PROTECTION

BACKGROUND

1. Technical Field

The present invention relates to airbags that provide side impact protection for occupants of automotive vehicles.

2. Background Art

Side airbag systems for automotive vehicles are well known. Current side airbag systems typically include an airbag module mounted in or on a seatback, usually adjacent the outboard portion of the seatback and/or the side wall of the vehicle. Such airbag modules include an airbag stored in a deflated condition and an inflator that provides gasses to inflate the airbag when triggered by an impact or roll-over sensor. When inflated, the side airbag expands to a position between seat occupant and the door, B-pillar, or vehicle side wall adjacent the seat, thereby providing restraint and/or cushioning for the occupant's head, thorax, arm, and/or shoulder regions. See, for example, U.S. patent application US 2006/0012155 A1, the disclosure of which is incorporated herein by reference.

Attempts have been made to improve occupant safety by tailoring the inflated position and/or shape of the side airbag. Achieving a configuration of the airbag to restrain and/or cushion the occupant's head, as well as the occupant's upper arm, shoulder, and thorax regions has resulted in complicated and expensive airbag designs. For example, U.S. Pat. No. 7,559,573 teaches a side airbag in which an internal strap connects inboard and outboard surfaces of the side airbag at a boundary location between lower and upper chambers of the bag. Such designs are inherently complicated and expensive to manufacture.

SUMMARY

Disclosed embodiments of the invention provide a side airbag having an inboard curved shape providing improved head and neck protection for a seat occupant.

In one embodiment, a side airbag for an automotive vehicle comprises an outboard panel having a perimeter edge and a first vertical length and an inboard panel having a perimeter edge and a second vertical length shorter than the first vertical length, the inboard and outboard panels joined to one another around their respective perimeter edges to form an enclosed volume such that when the airbag is inflated a mid-thickness line is concave toward the inboard panel.

In another embodiment, when the airbag is inflated an upper portion of the airbag is of greater lateral thickness than a lower portion of the side airbag.

In another embodiment, the side airbag further comprises an inflator supplying gasses to inflate the side airbag, and the side airbag has an inflated position wherein the inboard panel is adjacent a seat and the outboard panel is adjacent a vehicle side wall.

In another embodiment, the side airbag is stored within the seat when in a deflated condition.

In another embodiment, the joined perimeter edges describe a saddle shape curving toward the inboard panel then the side airbag is inflated.

In another embodiment, the inboard panel and outboard panel are formed of a single piece of material and share a common fold line.

In another embodiment, an occupant safety system for a vehicle comprises a seat, a side airbag having an inflated condition wherein the side airbag is positioned between the seat and an interior side wall of the vehicle, and an inflator providing gasses to inflate the side airbag. The side airbag comprises an outboard panel having a perimeter edge and a first vertical length, and an inboard panel having a perimeter edge and a second vertical length shorter than the first vertical length. The inboard and outboard panels are joined to one another around their respective perimeter edges to form an enclosed volume such that when in the inflated condition the shorter vertical length of the inboard panel causes the airbag to curve toward the seat.

In another embodiment, a method of making a side airbag comprises the steps of: forming an inboard panel having a perimeter edge and a first vertical length; forming an outboard panel having a perimeter edge a second vertical length greater than the first vertical length; and joining the inboard panel and the outboard panel to one another around their respective perimeter edges of to form an enclosed volume, such that when the side airbag is inflated a mid-thickness line of the side airbag is concave towards the inboard panel.

BRIEF DESCRIPTION OF THE DRAWINGS

Embodiments of the present invention will now be described by way of example only with reference to the accompanying drawings in which.

DETAILED DESCRIPTION

Figure 1:
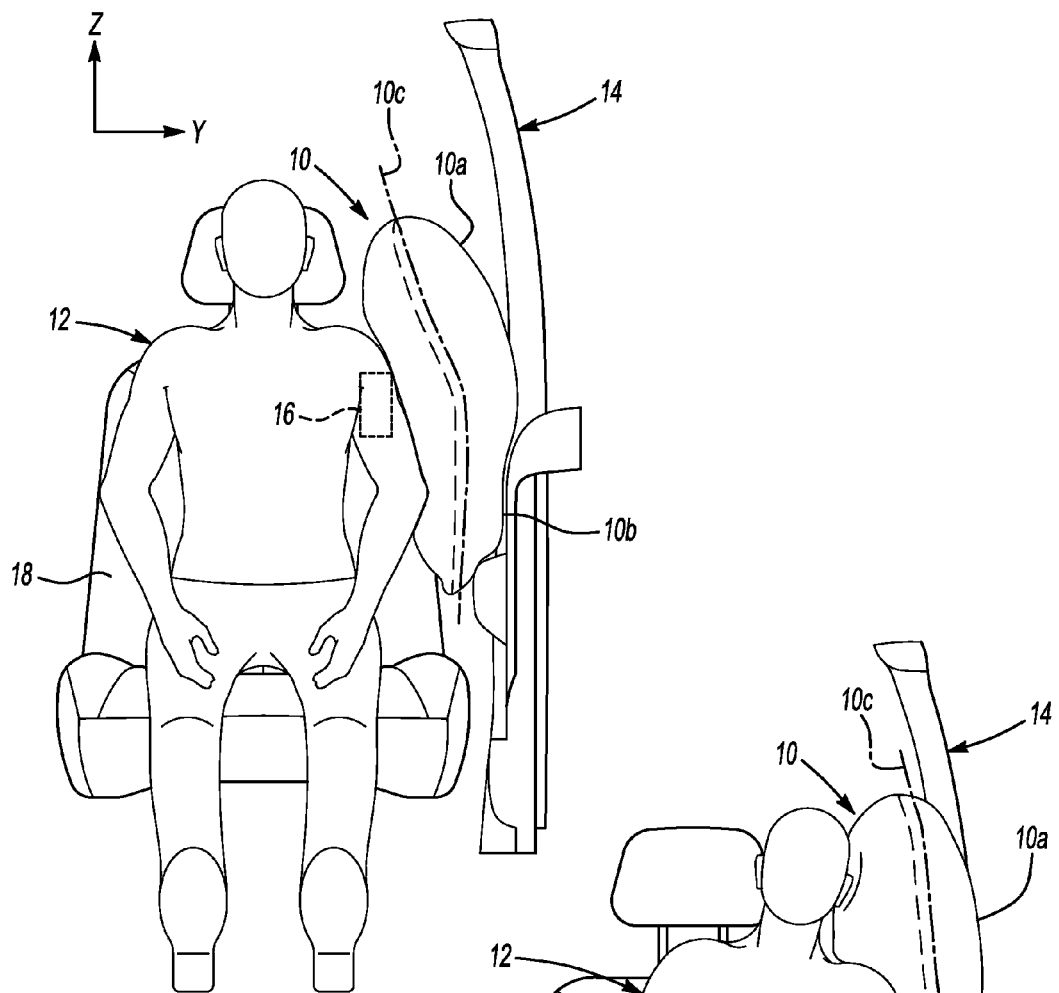
FIG. 1 is a simplified diagram of portions of a vehicle passenger compartment including a side airbag according to an embodiment of the present invention.

Referring to FIG. 1, an automotive vehicle interior is shown to include a side airbag 10 according to an embodiment of the present invention. Side airbag 10 is shown in the inflated or deployed condition in which it is positioned between a seat occupant 12 and an interior side wall 14 of the vehicle. As is well known in the occupant restraints arts, side airbag 10 is formed of a thin, flexible, and substantially gas-impermeable material (such as single- or multi-layer, coated or uncoated, nylon or polyester fabric) and is inflated by gasses supplied by an inflator 16. Inflator 16 and airbag 10 (when in the deflated condition) may be contained within, attached to, or otherwise associated with seat 18.

In the inflated condition shown, side airbag 10 has an upper portion 10a positioned between side wall 14 and the head and neck area of seat occupant 12 and a lower portion 10b positioned between the side wall and an arm, thorax, and shoulder region of the occupant.

Figure 2:
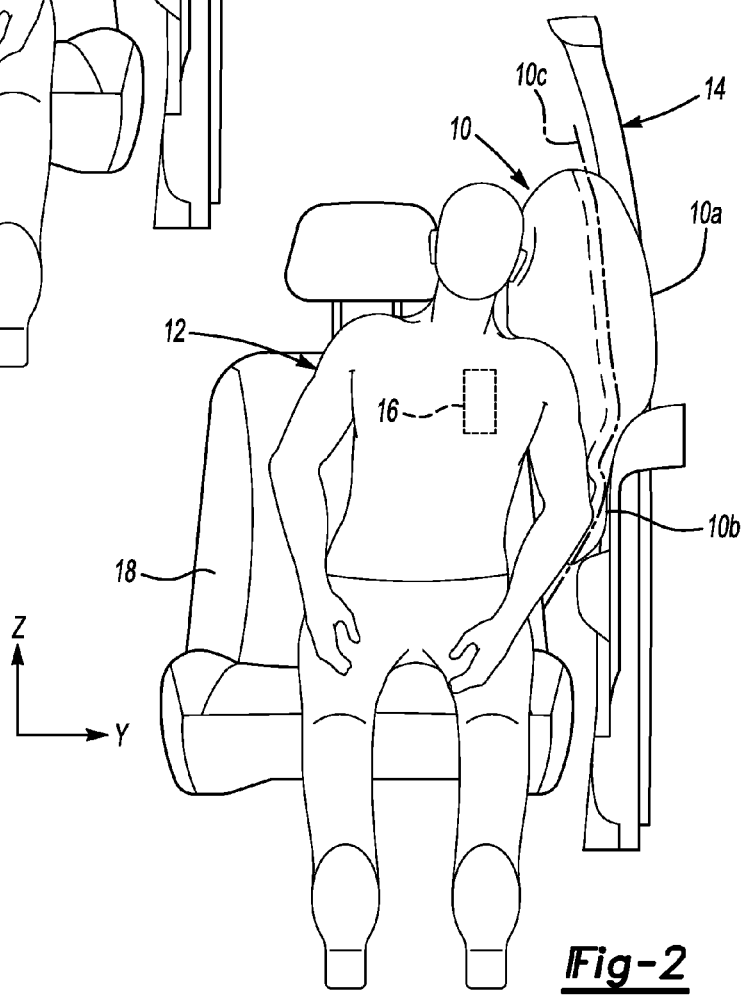
FIG. 2 is a view similar to FIG. 1 except that a seat occupant is displaced outboard during a side impact.

In FIG. 2, seat occupant 12 is shown displaced outboard and into contact with side airbag 10, such as may occur during a side impact or roll-over event.

Upper airbag portion 10a is sufficiently thick (as measured parallel with the lateral or y-axis of the vehicle as indicated in FIG. 1) to provide for engagement or contact between the seat occupant's head and the side airbag 10 early in a crash or roll-over event that causes the head to be forced outboard toward the deployed airbag. Lower airbag portion 10b may be relatively less thick in comparison with upper portion 10a. Engagement between lower airbag portion 10b and the arm/shoulder/thorax region of occupant 12 is somewhat delayed, in comparison to if the lower airbag portion were as thick as upper portion 10a.

When inflated, side airbag 10 is curved inboard, toward seat 18 and occupant 12. This inboard-curved shape may be seen by drawing an imaginary mid-thickness line 10c along the vertical extent of the airbag. Mid-thickness line 10c is concave toward the side of the airbag formed by the inboard panel. The inboard-curved shape positions upper airbag portion 10a closer to the head of occupant 12 and so results in an early engagement between the occupant's head and the airbag when the occupant is displaced or forced outboard relative to the seat and other vehicle structure during a side impact, roll-over, or other event.

Computer modeling and other testing has indicated that, under some conditions, a side airbag with an inboard-curved shape may reduce the amount of relative displacement between the head and neck and/or the amount of relative displacement between the neck and spine during a side impact. It is believed that this reduction in relative displacement may result in a reduction in the levels of tension and/or shear forces experienced by the occupant's neck.

Figure 3:
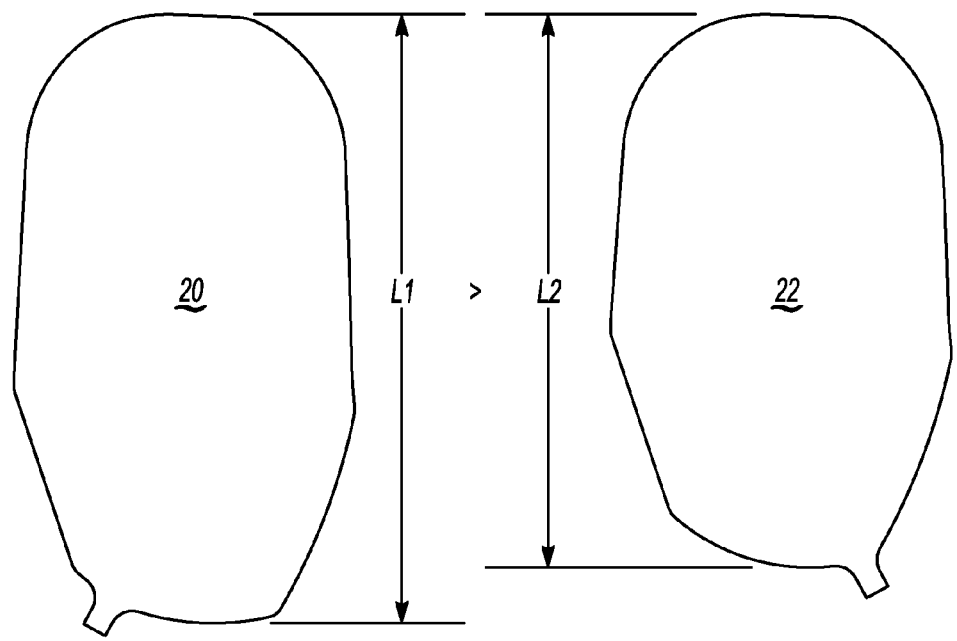
FIG. 3 is a simplified illustration of a first embodiment of inboard and outboard panels of a side airbag prior to assembly.

Referring now to FIG. 3, the inboard curve of airbag 10 is achieved by forming the airbag from an outboard panel 20 having a vertical length $L_1$ and an inboard panel 22 having a vertical length $L_2$, with $L_1$ being greater than $L_2$. When inboard and outboard panels 20, 22 are joined to one another around their respective outer perimeter edges, the shorter inboard vertical length $L_2$ causes the upper portion 10a to be drawn or pulled inboard with respect to the lower portion 10b. The inboard-curved shape of airbag 10 is thus achieved very simply and without the added complexity of internal tethers, straps, or other features.

Figure 4:
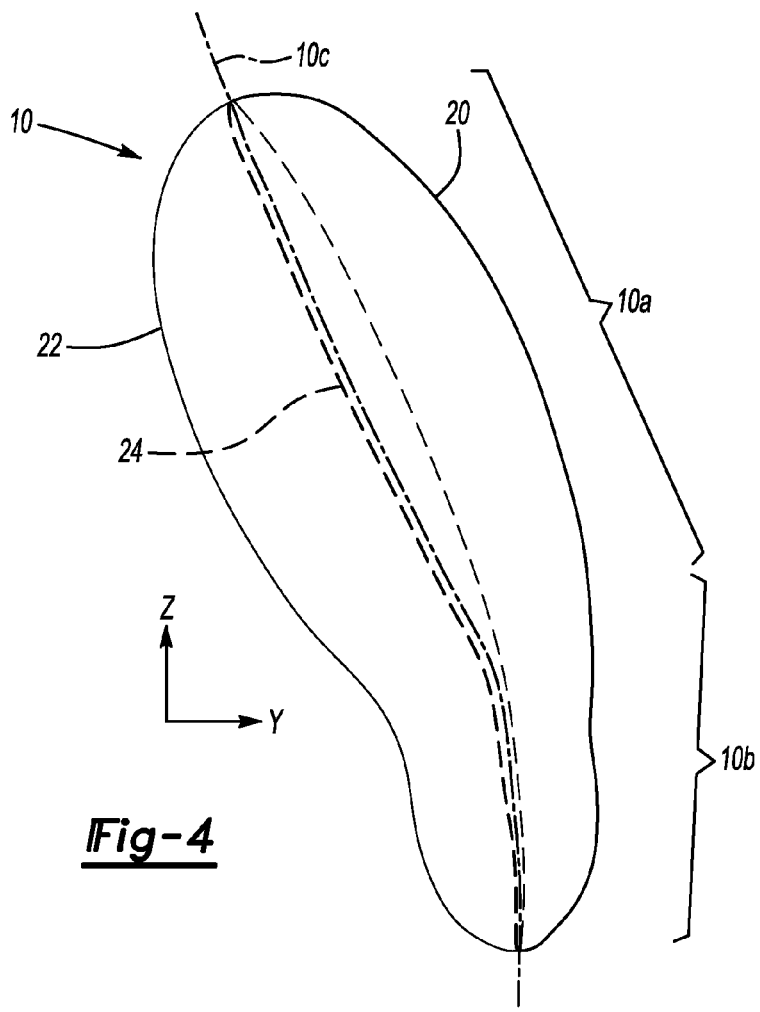
FIG. 4 is a simplified detail view of the side airbag of FIGS. 1 and 2.

As best seen in FIG. 4, a perimeter seam 24 joining outboard and inboard panels 20, 22 has an inwardly-curved saddle shape when viewed in the Y-Z plane. Perimeter seam 24 may or may not be coincident with mid-thickness line 10c, depending on the exact configuration of airbag 10.

Figure 5:
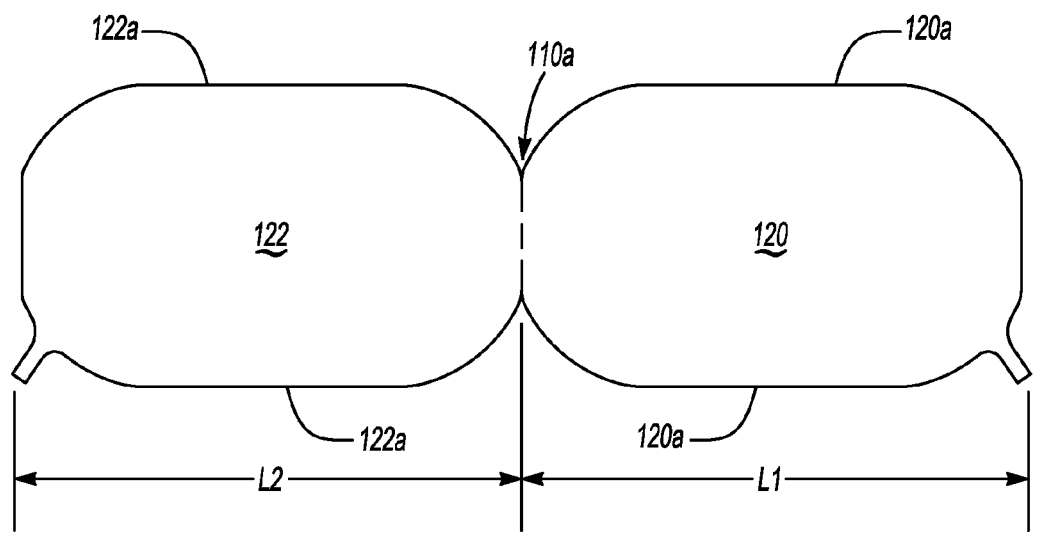
FIG. 5 is a simplified illustration of a second embodiment of inboard and outboard panels of a side airbag prior to assembly.

FIG. 5 depicts an alternative construction of an asymmetric side airbag in which the outboard panel 120 and the inboard panel 122 are formed from a single piece of material. The single piece of material is then folded at a fold line 110a and the outboard and inboard panels 120, 122 are joined to one another along the remaining peripheral edges 120a, 122a. The vertical lengths $L_2$ and $L_1$ are measured from fold line 110a, and $L_1$ is greater than $L_2$.

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations consistent with the present disclosure, e.g., ones in which components are arranged in a slightly different order than shown in the embodiments in the Figures. Those of ordinary skill in the art will recognize that the teachings of the present disclosure may be applied to other applications or implementations.

What is claimed:

1. A side airbag for an automotive vehicle comprising:
   an outboard panel having a perimeter edge and a first vertical length;
   an inboard panel having a perimeter edge and a second vertical length shorter than the first vertical length, the inboard and outboard panels joined to one another around their respective perimeter edges to form an enclosed volume such that when the airbag is inflated a mid-thickness line is concave toward the inboard panel.

2. The apparatus according to claim 1 wherein when the airbag is inflated an upper portion of the side airbag is of greater lateral thickness than a lower portion of the side airbag.

3. The apparatus according to claim 1 further comprising an inflator supplying gasses to inflate the side airbag, and wherein the side airbag has an inflated position wherein the inboard panel is adjacent a seat and the outboard panel is adjacent a vehicle side wall.

4. The apparatus according to claim 3 wherein the side airbag is stored within the seat when in a deflated condition.

5. The apparatus according to claim 1 wherein the joined perimeter edges describe a saddle shape curving toward the inboard panel then the side airbag is inflated.

6. The apparatus according to claim 1 wherein the inboard panel and outboard panel are formed of a single piece of material and share a common fold line.

7. The apparatus according to claim 1 wherein at least one of the inboard panel and the outboard panel are formed of a polyester fabric.

8. An occupant safety system for a vehicle comprising:
   a seat;
   a side airbag having an inflated condition wherein the side airbag is positioned between the seat and an interior side wall of the vehicle, the side airbag comprising:
      an outboard panel having a perimeter edge and a first vertical length; and
      an inboard panel having a perimeter edge and a second vertical length shorter than the first vertical length, the inboard and outboard panels joined to one another around their respective perimeter edges to form an enclosed volume such that when in the inflated condition the shorter vertical length of the inboard panel causes the airbag to curve toward the seat; and
   an inflator providing gasses to inflate the side airbag.

9. The system according to claim 8 wherein when in the inflated condition an upper portion of the side airbag is of greater lateral thickness than a lower portion of the side airbag.

10. The system according to claim 8 wherein the inflator is stored within the seat.

11. The system according to claim 8 wherein the side airbag is stored within the seat when in a deflated condition.

12. The system according to claim 8 wherein the joined perimeter edges describe a saddle shape curving toward the inboard panel when the airbag is in the inflated condition.

13. The system according to claim 8 wherein the inboard panel and outboard panel are formed of a single piece of material and share a common fold line.

14. The system according to claim 8 wherein at least one of the inboard panel and the outboard panel are formed of a polyester fabric.

15. A method of making a side airbag comprising the steps of:
   forming an inboard panel having a perimeter edge and a first vertical length;
   forming an outboard panel having a perimeter edge a second vertical length greater than the first vertical length; and
   joining the inboard panel and the outboard panel to one another around their respective perimeter edges of to form an enclosed volume, such that when the side airbag is inflated a mid-thickness line of the side airbag is concave towards the inboard panel.

16. The method according to claim 15 wherein the inboard panel and outboard panel are formed of a single piece of material and share a common fold line, and the single piece of material is folded at the fold line prior to joining the inboard panel to the outboard panel.

* * * * *